(12) United States Patent
Link

(10) Patent No.: US 7,971,417 B2
(45) Date of Patent: Jul. 5, 2011

(54) ELECTIVE DOWN PRESSURE SYSTEM FOR CUTTING UNITS OF GRASS MOWING MACHINE

(75) Inventor: Todd Allen Link, Apex, NC (US)

(73) Assignee: Deere & Company, Moline, IL (US)

( * ) Notice: Subject to any disclaimer, the term of this patent is extended or adjusted under 35 U.S.C. 154(b) by 665 days.

(21) Appl. No.: 11/633,830

(22) Filed: Dec. 5, 2006

(65) Prior Publication Data

US 2008/0127619 A1 Jun. 5, 2008

(51) Int. Cl.
*A01D 34/00* (2006.01)

(52) U.S. Cl. .......................................... 56/15.7; 56/15.8

(58) Field of Classification Search .................... 56/6, 7, 56/14.9, 15.2, 15.5, 15.7–15.9, 16.2
See application file for complete search history.

(56) References Cited

U.S. PATENT DOCUMENTS

| | | | |
|---|---|---|---|
| 3,808,778 A | | 5/1974 | Hoffmeyer et al. |
| 4,266,617 A | * | 5/1981 | Mullet et al. ..................... 172/76 |
| 4,723,403 A | * | 2/1988 | Webster .......................... 56/377 |
| 4,769,976 A | | 9/1988 | Bassett et al. |
| 4,864,805 A | | 9/1989 | Hager et al. |
| 5,042,236 A | * | 8/1991 | Lamusga et al. ..................... 56/7 |
| 5,297,378 A | | 3/1994 | Smith |
| 6,412,258 B1 | * | 7/2002 | Doerflinger ......................... 56/7 |
| 6,698,171 B2 | * | 3/2004 | Doerflinger ......................... 56/7 |

FOREIGN PATENT DOCUMENTS

| | | |
|---|---|---|
| EP | 1 685 758 | 2/2008 |
| GB | 1241751 | 8/1971 |

* cited by examiner

*Primary Examiner* — Alicia M Torres

(57) ABSTRACT

An elective down pressure system for cutting units of a grass mowing machine with lift and lower mechanisms connected to the lift arms with lost motion couplings that may be set to either a downforce position in which the lift and lower mechanisms urge the lift arms to apply downforce to the cutting units while they are on the ground surface, or a no downforce position in which the lift and lower mechanisms discontinue urging the lift arms to apply downforce once the cutting units are on the ground surface.

13 Claims, 10 Drawing Sheets

ELECTIVE DOWN PRESSURE SYSTEM FOR CUTTING UNITS OF GRASS MOWING MACHINE

FIELD OF THE INVENTION

The present invention relates to grass mowing machines, and more specifically to applying down pressure to cutting units of a grass mowing machine.

BACKGROUND

Grass mowing machines used to mow golf courses, parks, athletic fields, and other areas where quality and consistent cut height is important, may have cutting units attached to lift arms extending from a traction vehicle. Lift and lower mechanisms may be used to raise and lower the lift arms. Once a cutting unit is lowered to the ground surface, the weight of the cutting unit and lift arm may be used to maintain the cutting unit in ground contact during mowing operations. However, at relatively high travel speeds or rough terrain, the cutting unit has the tendency to bounce and effectively change the height at which the grass is being cut in relation to the ground. Additionally, thick grass or thatchy conditions can make a cutting units rise up, effectively changing the height of cut in relation to the ground.

To prevent or reduce variations in cut height due to bouncing of a cutting unit or heavy grass, some grass mowing machines include devices that apply a supplemental down force to each cutting unit. For example, U.S. Pat. No. 5,297,378 assigned to Deere & Company of Moline, Ill., relates to a suspension mechanism for reel mowers that uses hydraulic pressure on the lift cylinders to apply a down force to each cutting unit. U.S. Pat. No. 5,042,236 assigned to The Toro Company of Minneapolis, Minn., relates to a cutting reel suspension in which each lift arm is biased downwardly by a spring arrangement.

During mowing operations, these devices apply supplemental down pressure continuously to each cutting unit, even if the added force is unnecessary. One adverse effect of the continous application of down pressure is a higher draft load on each cutting unit, which requires higher mower power from the traction vehicle to push the cutting units across the grass. In conditions where supplemental down force is not needed, the extra power required to push the cutting units becomes a parasitic load. As a result, engine horsepower consumed for application of down force is unavailable for other important functions such as climbing steep hills.

A grass mowing machine is needed that allows selective application of downforce to a cutting unit, instead of applying downforce continously to the cutting unit. A grass mowing machine is needed that can reduce the engine horsepower required to push each cutting unit. A grass mowing machine is needed that can increase the engine horsepower available for hill climbing of the traction vehicle.

SUMMARY OF THE INVENTION

The elective down pressure system of the present invention allows elective application of downforce to each cutting unit, instead of applying downforce continously to the cutting unit. The elective down pressure system can reduce engine horsepower required to push each cutting unit. As a result, the present invention can increase the engine horsepower available for hill climbing of the traction vehicle.

Lift and lower mechanisms are connected to pivotable lift arms that raise and lwower each cutting unit. The lift and lower mechanisms move in a first direction to urge the lift arms to pivot in a first direction to raise the cutting units, or in a second direction to urge the lift arms to pivot in a second direction to lower the cutting units. The lift and lower mechanisms have lost motion couplings that may be set in a downforce position or a no downforce position. In the no downforce position, the lift and lower mechanisms continue moving out while the cutting units are on a ground surface without urging the lift arms to pivot in the second direction. In the downforce position, the lift and lower mechanisms urge the lift arms to apply down pressure to the cutting units while they are on the ground surface.

DESCRIPTION OF THE PREFERRED EMBODIMENTS

In one embodiment shown in FIGS. 1-4, grass mowing machine 100 may be a fairway mower including traction vehicle 101 carrying a first row of three reel-type cutting units 102-04 and a second row of two reel-type cutting units 105-06. Alternatively, the grass mowing machine may be a greens mower or any other type of mower having two or more cutting units. The cutting units may be rotary or reel-type cutting units.

In the embodiment of FIGS. 1-4, each cutting unit 102-06 may be connected to the outer end of a lift arm 107-11. A first or inner end of each lift arm may be pivotably attached to the frame or body of the traction vehicle, and the second or outer end may be pivotably attached to a cutting unit with a knuckle joint 119-23 or yolk supporting the cutting unit. The knuckle joint may allow the cutting unit to pivot on a generally vertical axis and/or horizontal axis while it is raised for transport or service, or while it is on the ground surface for mowing. While a cutting unit is on the ground surface, it may be supported with a front roller 126-30 and a rear roller 132-36.

Each lift and lower mechanism may be connected to one or more lift arms 107-11 so as to urge the lift arms in a first direction to raise one or more cutting units to a transport position, or in a second direction to lower one or more cutting units to the ground surface. In the embodiment of FIGS. 1-4, the lift and lower mechanisms are hydraulic cylinders 138-40 having extensible rods 172-74. The extensible rods can be retracted to urge lift arms 107-11 in a first direction to raise the cutting units to a transport position, or extended to urge the lift arms in a second direction to lower the cutting units to the ground surface. Each lift and lower mechanism may be connected to a single lift arm, or between two lift arms. Each lift arm may be connected to a rotatable shaft, and the lift and lower mechanism may be connected to a crank on the shaft.

Figure 8:
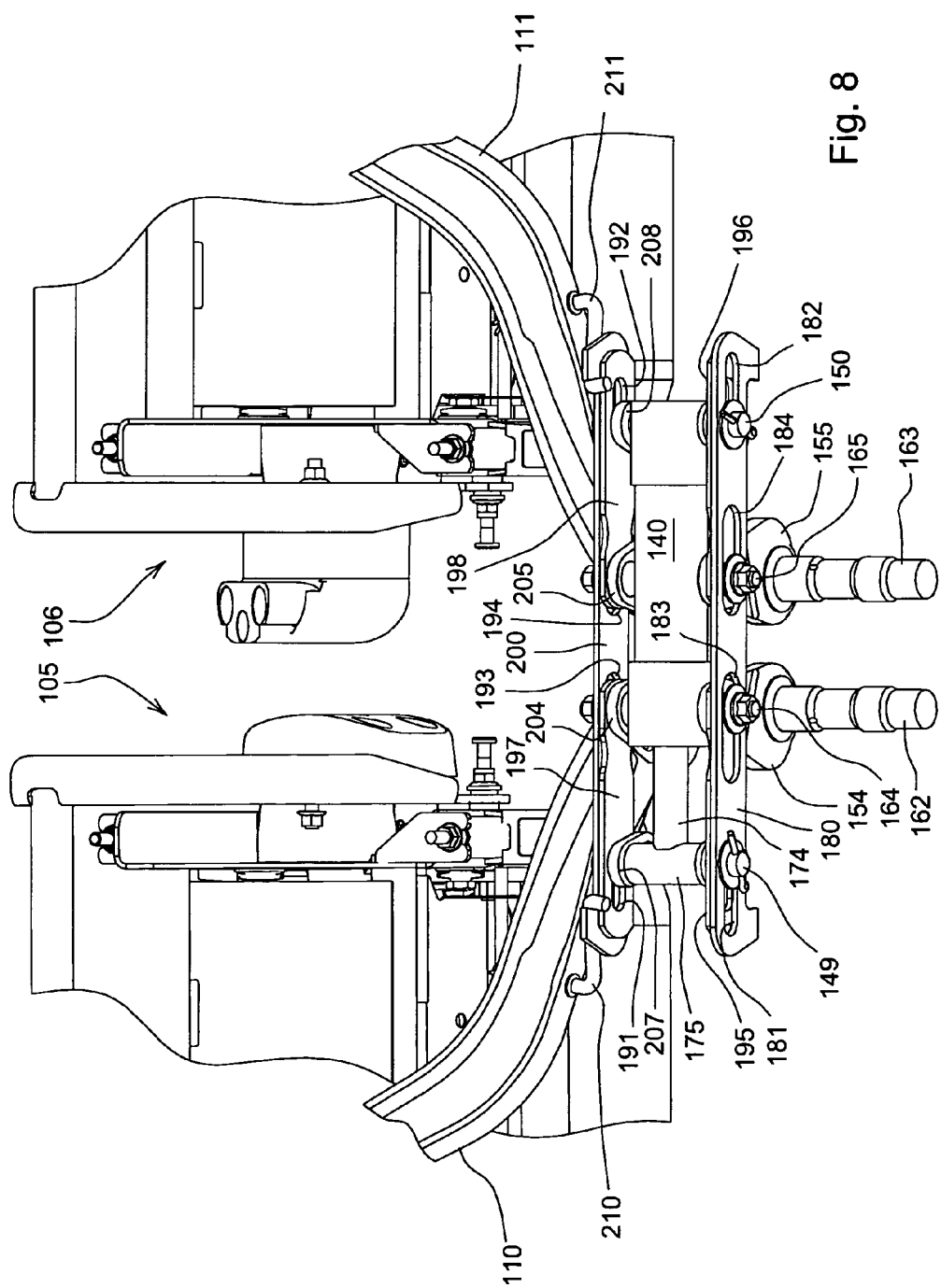
FIG. 8 is a rear view of part of a second row of reel-type cutting units with an elective down pressure system according to a first embodiment, in which the cutting units are raised for transport or service.
Figure 9:
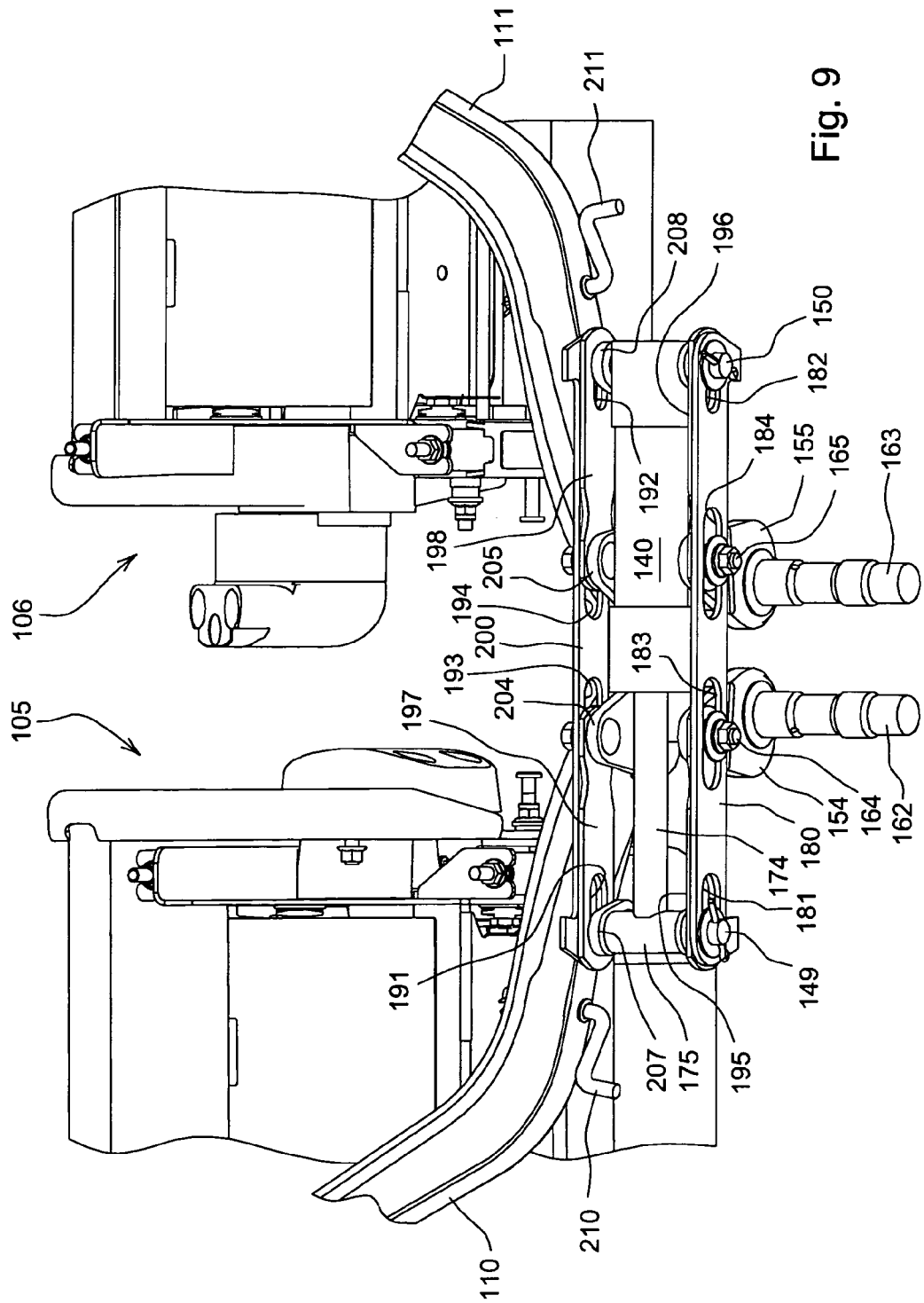
FIG. 9 is a rear view of part of a second row of reel-type cutting units with an elective down pressure system according to a first embodiment, in which the cutting units are lowered for mowing in the no downforce position.
Figure 10:
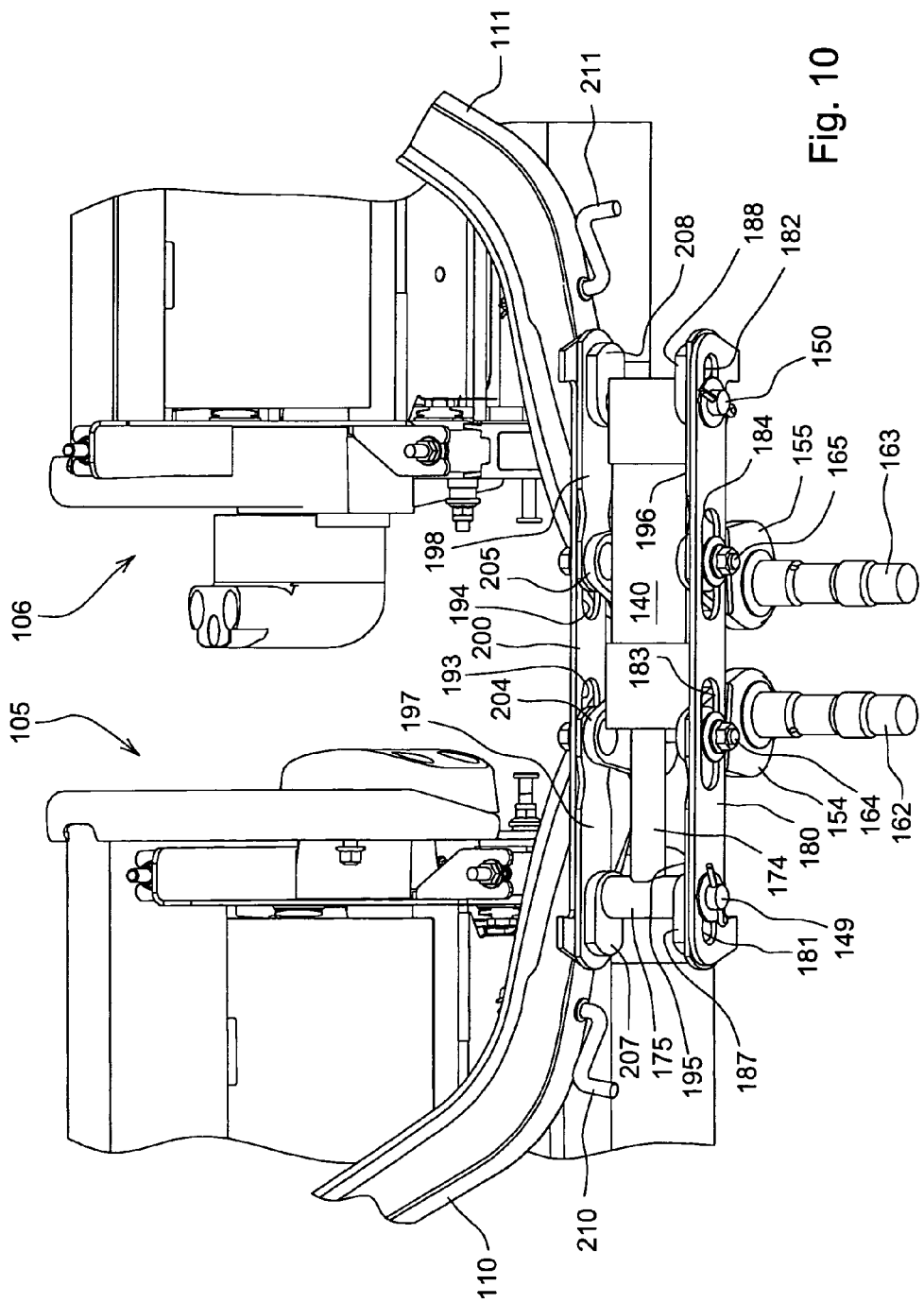
FIG. 10 is a rear view of part of a second row of reel-type cutting units with an elective down pressure system according to a first embodiment, in which the cutting units are lowered for mowing in the downforce position.

Additionally, each lift and lower mechanism may be set to either a downforce position in which the mechanism continues to urge the lift arm in a second direction to apply downforce to the cutting units while the cutting units are on the ground surface, or to a no downforce position in which the lift and lower mechanism discontinues urging the lift arm in a second direction to apply downforce to the cutting units once they are on the ground surface. Each lift and lower mechanism may include a lost motion coupling that may be set to a downforce or no downforce position. The lost motion coupling may be a slotted connection with a removable pin shown in FIGS. 5-7 depicting a first or front row of cutting units 102-04, or slotted plates shown in FIGS. 8-10 depicting a second or back row of cutting units 105-06.

Although hydraulic cylinders 138-40 are preferred lift and lower mechanisms, other mechanical, hydraulic, pneumatic or electrical devices may perform these functions, and also may provide down pressure to a cutting unit once it has been lowered to the ground surface. An operator may elect downforce or no downforce for a cutting unit by setting the lift and lower mechanism at the desired position.

Figure 1:
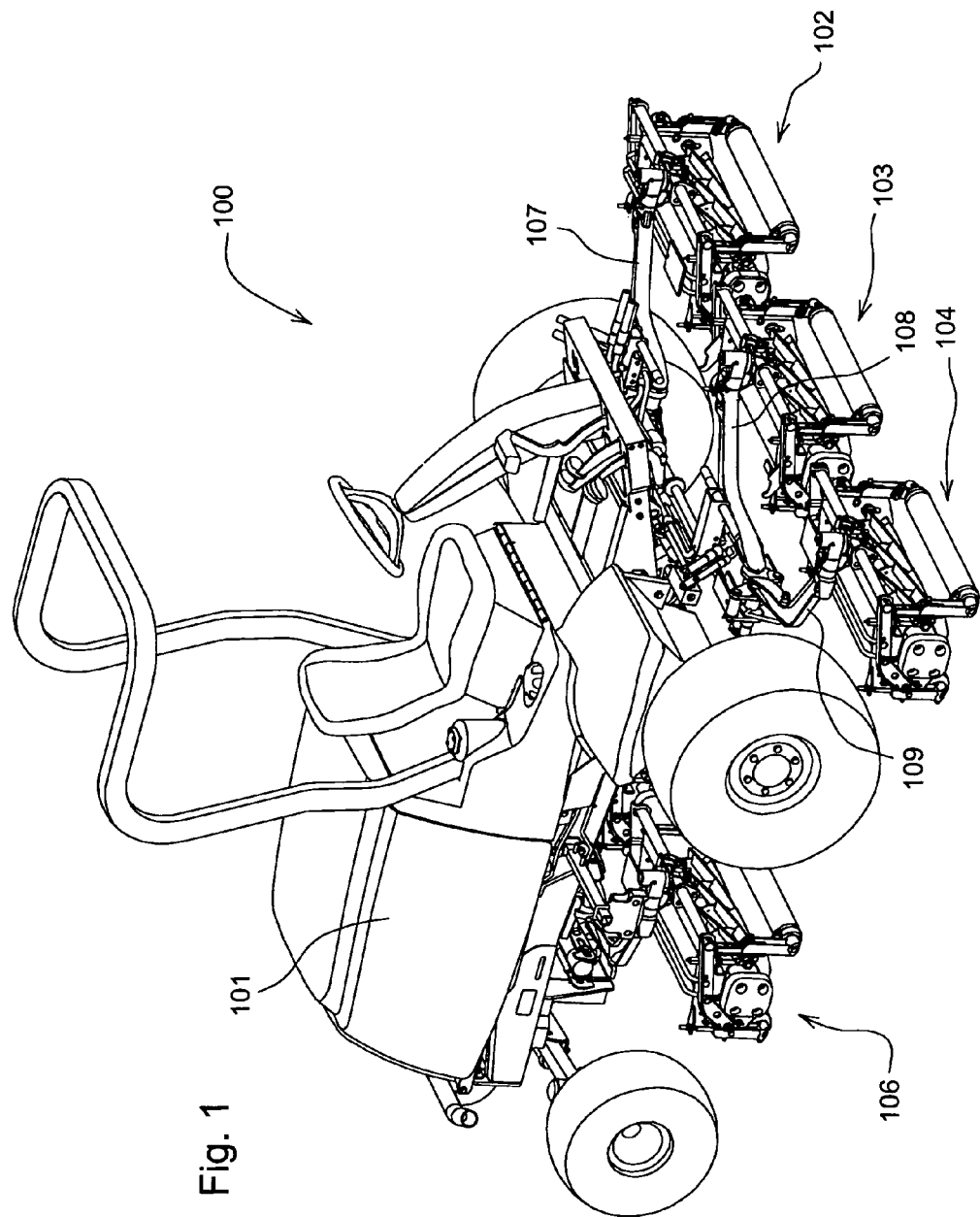
FIG. 1 is a front perspective view of a grass mowing machine with an elective down pressure system for cutting units according to a first embodiment of the invention.
Figure 2:
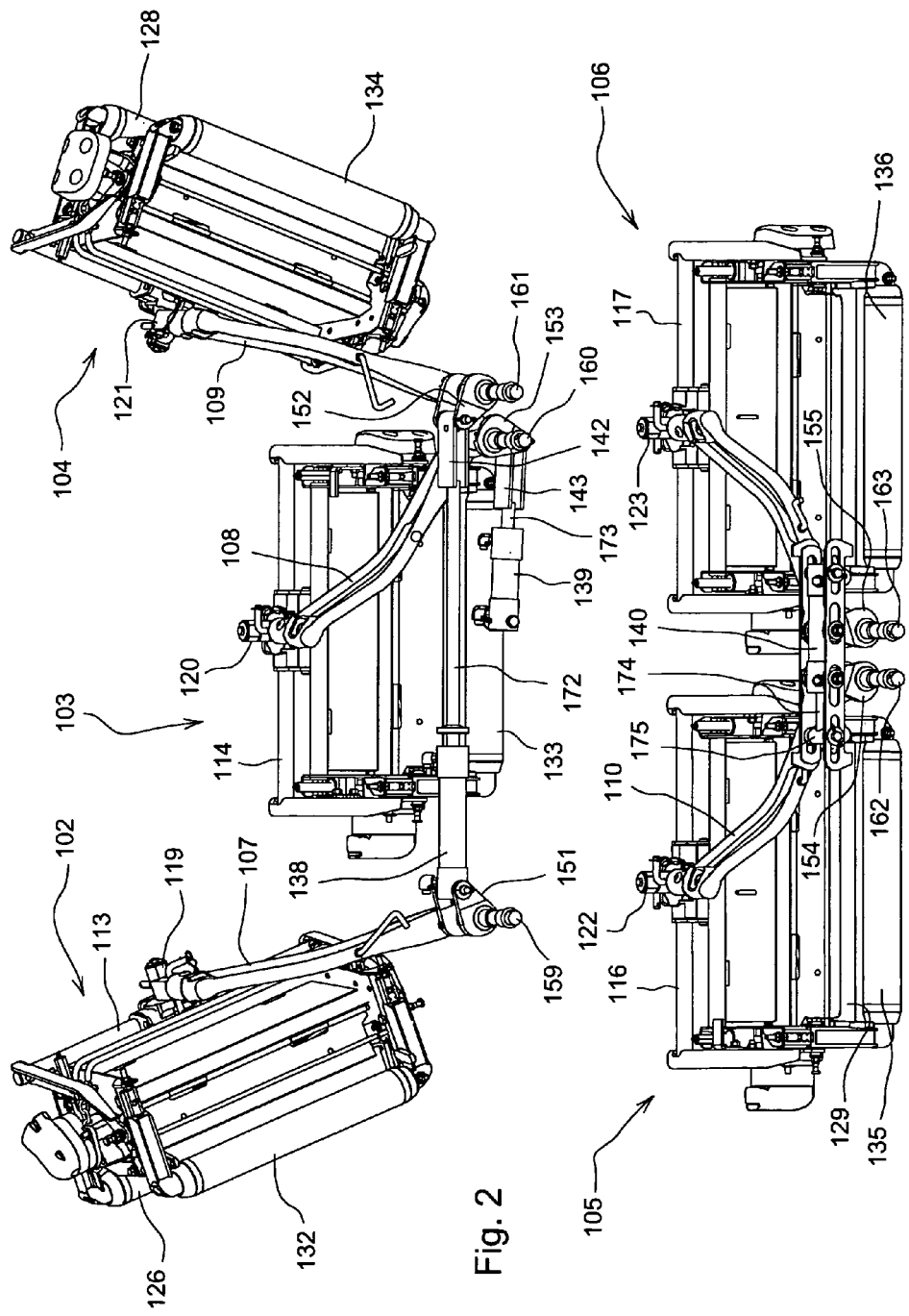
FIG. 2 is a rear perspective view of two rows of reel-type cutting units with an elective down pressure system according to a first embodiment, with the cutting units in a raised position.
Figure 3:
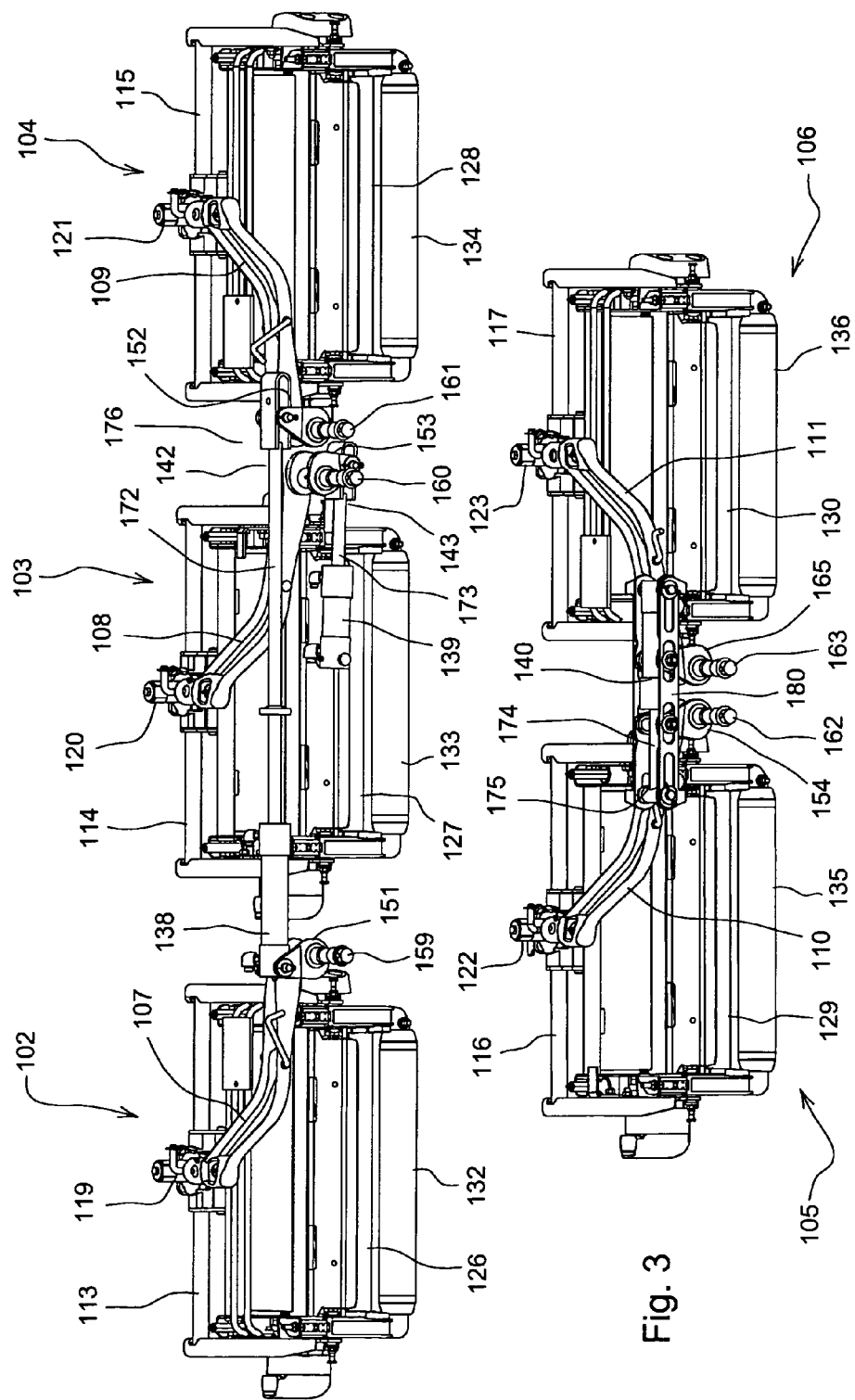
FIG. 3 is rear perspective view of two rows of reel-type cutting units with an elective down pressure system according to a first embodiment, with the cutting units in a lowered position and without downforce applied to the cutting units.
Figure 4:
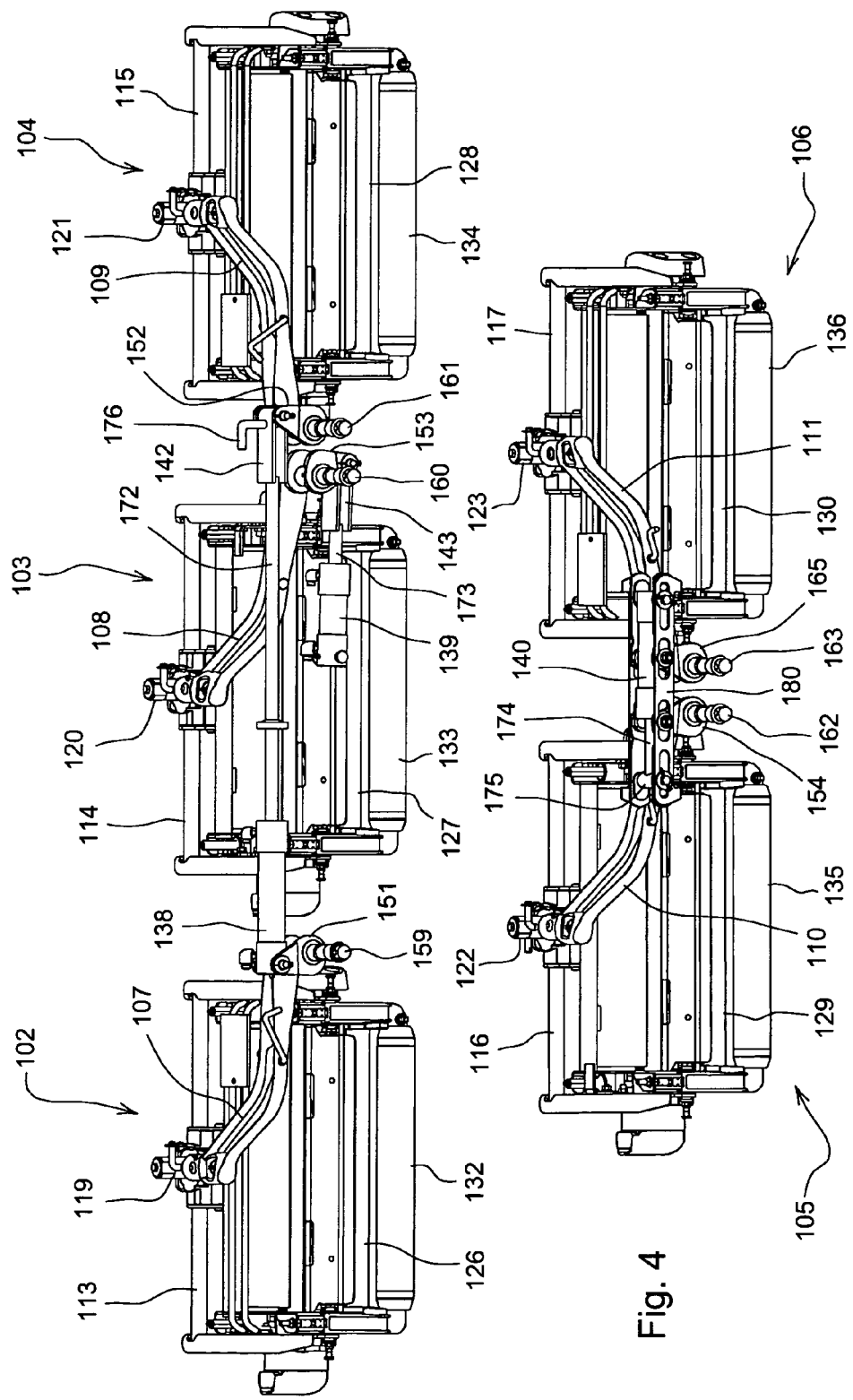
FIG. 4 is a rear perspective view of two rows of reel-type cutting units with an elective down pressure system according to a first embodiment, with the cutting units in a lowered position and having downforce applied to the cutting units.
Figure 5:
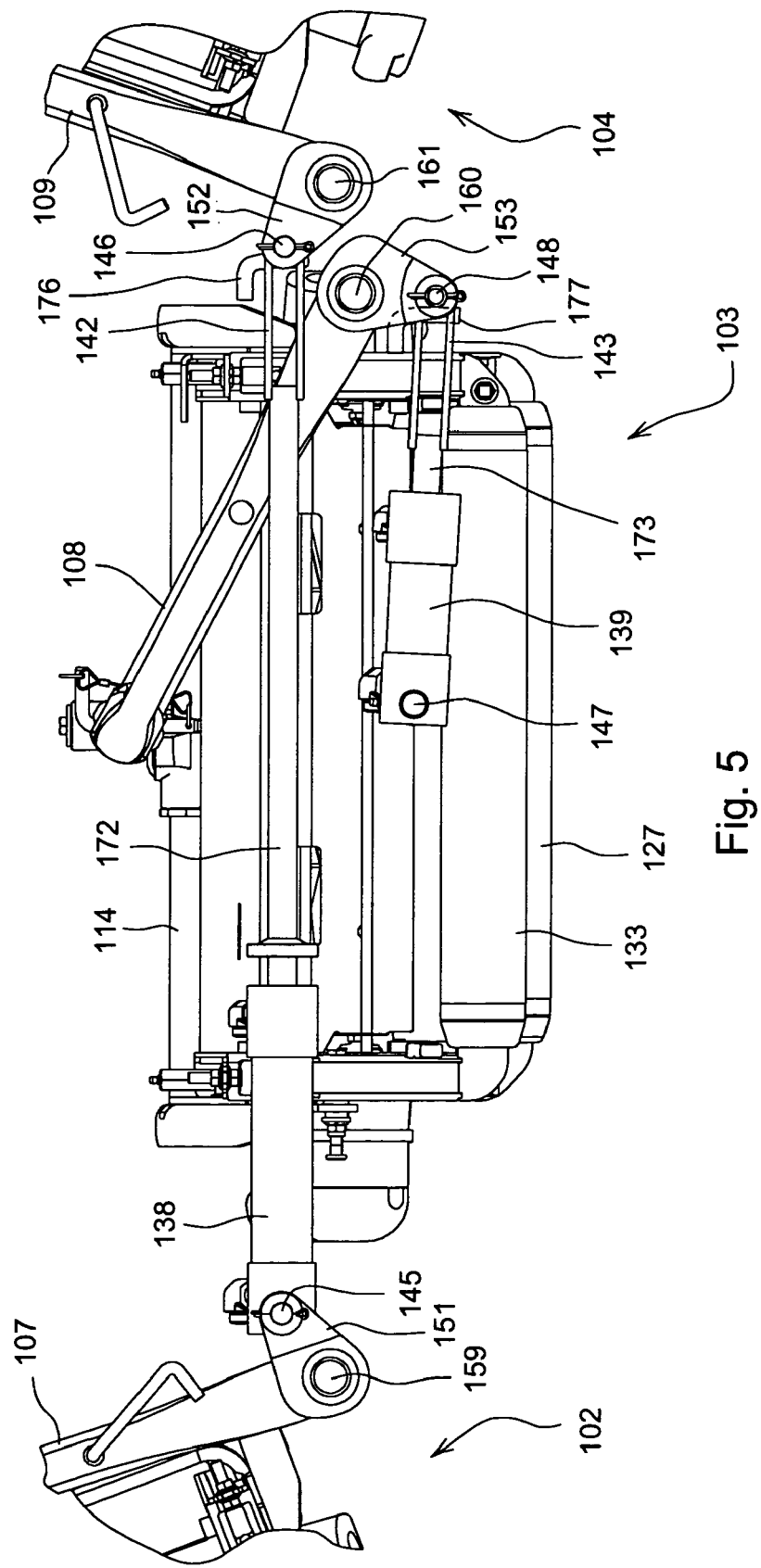
FIG. 5 is a rear view of part of a first row of reel-type cutting units with an elective down pressure system according to a first embodiment, in which the cutting units are raised for transport or service.
Figure 6:
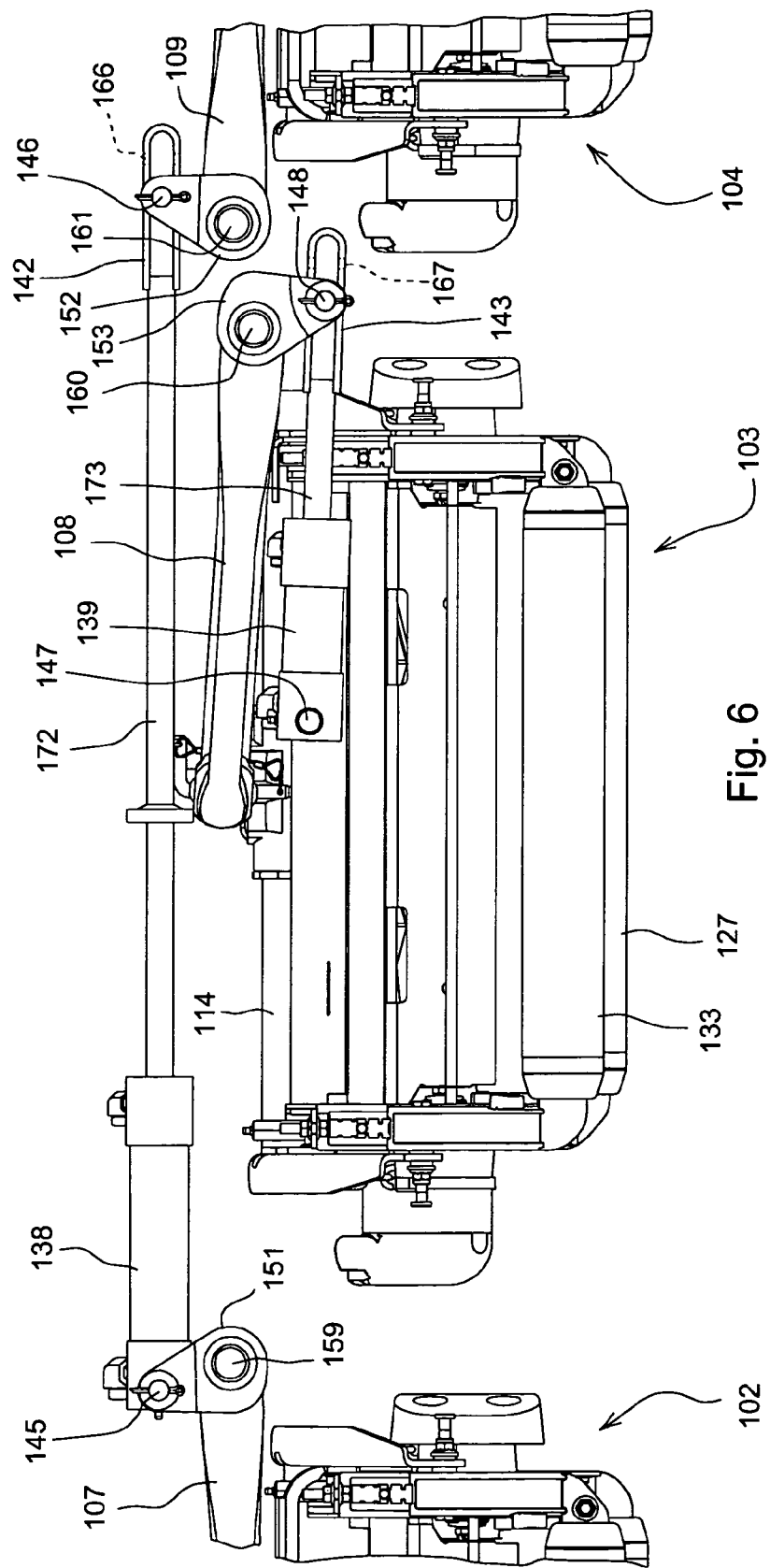
FIG. 6 is a rear view of part of a first row of reel-type cutting units with an elective down pressure system according to a first embodiment, in which the cutting units are lowered for mowing in the no downforce position.
Figure 7:
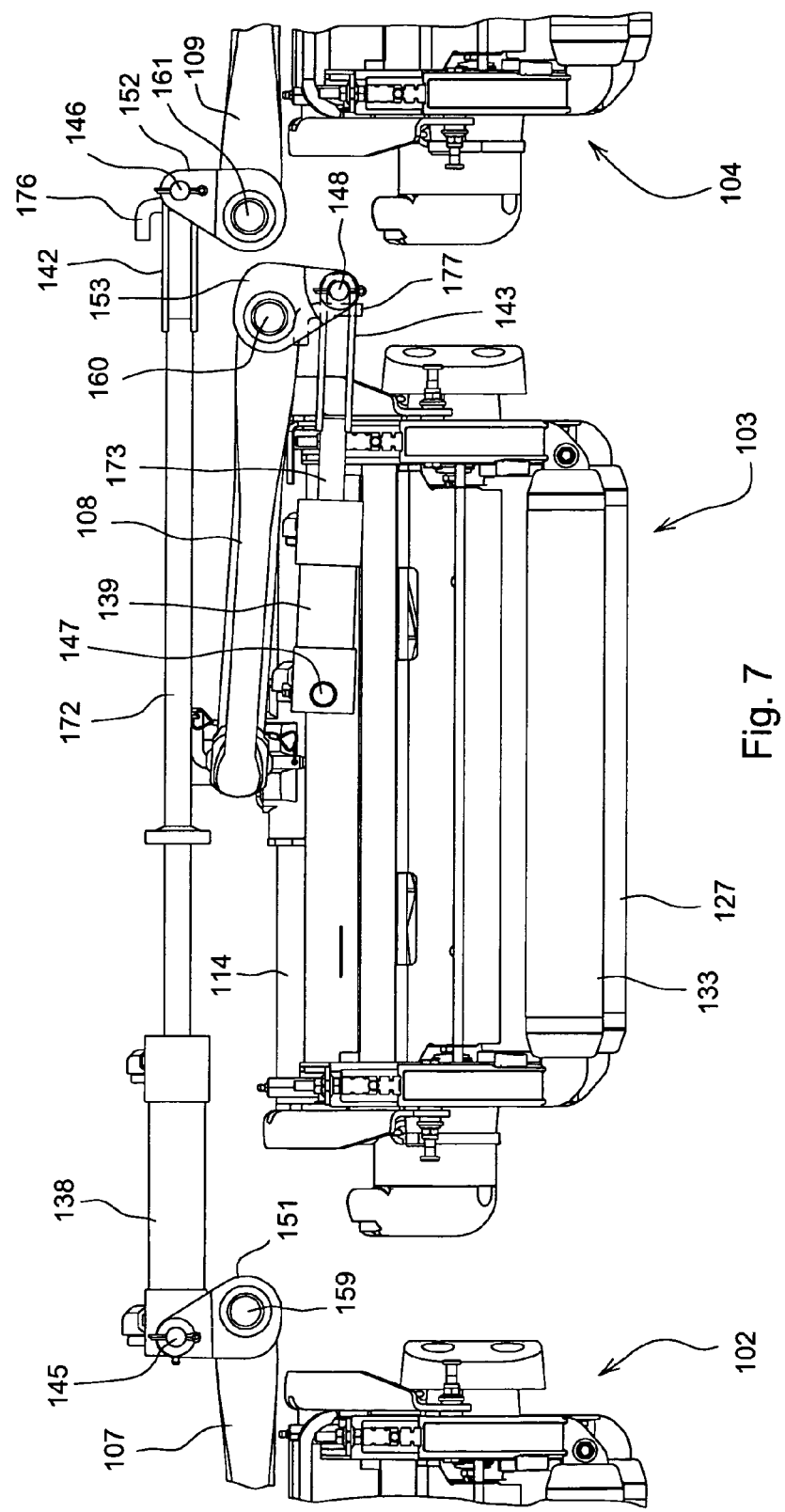
FIG. 7 is a rear view of part of a first row of reel-type cutting units with an elective down pressure system according to a first embodiment, in which the cutting units are lowered for mowing in the downforce position.

In the embodiment of FIGS. 5-7, the lift and lower mechanism for cutting units 102 and 104 is hydraulic cylinder 138 which retracts extensible rod 172 to raise cutting units 102 and 104 to a transport or service position. Pivot pin 145 may connect hydraulic cylinder 138 to crank 151 on shaft 159. Pivot pin 146 may connect lost motion coupling 142 on the end of rod 172 to crank 152 on shaft 161. Crank 151 and lift arm 107 are both attached to shaft 159, and crank 152 and lift arm 109 are both attached to shaft 161. Retracting rod 172 causes cranks 151 and 152 to turn, turning shafts 159 and 161 in a direction to pivot lift arms 107 and 109 to raise cutting units 102 and 104.

As shown in FIG. 6, hydraulic cylinder 138 may extend rod 172 to lower cutting units 102 and 104 without applying downforce. The operator may elect no downforce by removing pin 176 from hole 166 in lost motion coupling 142. In the no downforce position, pivot pin 146 is not captured at the outer end of the lost motion coupling. As a result, once cutting units 102 and 104 are on the ground surface, rod 172 and hydraulic cylinder 138 do not continue pushing outwardly against pivot pins 145-46. While cutting units 102 and 104 are on the ground surface in the mowing position, the lift and lower mechanism does not continue urging cranks 151-52 and lift arms 107 and 109 to pivot in a direction to apply downforce to those cutting units. While cutting units 102 and 104 are on the ground surface, lost motion coupling 142 allows rod 172 to continue extending from hydraulic cylinder 138 without continuing to urge the cutting units down.

As shown in FIG. 7, an operator may elect application of downforce to cutting units 102 and 104 by inserting pin 176 into hole 166 in lost motion coupling 142. In the downforce position, pivot pin 146 is captured at the outer end of the lost motion coupling. As a result, once cutting units 102 and 104 are on the ground surface, rod 172 and hydraulic cylinder 138 continue to push outwardly against pivot pins 145-46. While cutting units 102 and 103 are on the ground surface in the mowing position, the lift and lower mechanism continues urging cranks 151, 152 and lift arms 107 and 109 to pivot in a direction to apply downforce to cutting units 102 and 104.

Also shown in FIGS. 5-7, the lift and lower mechanism for cutting unit 103 may be hydraulic cylinder 139 that may retract rod 173 to raise cutting unit 103 to a transport or service position. Pivot pin 147 may connect hydraulic cylinder 139 to the mower frame. Pivot pin 148 may connect lost motion coupling 143 on the end of rod 173 to crank 153 on shaft 160. Crank 153 and lift arm 108 are both attached to shaft 160. Retracting rod 173 causes crank 153 to turn, rotating shaft 160 in a direction to pivot lift arm 108 to raise cutting unit 103.

As shown in FIG. 6, hydraulic cylinder 139 may extend rod 173 to lower cutting unit 103 without applying downforce. The operator may elect no downforce by removing pin 177 from hole 167 in lost motion coupling 143. In the no downforce position, pivot pin 148 is not captured at the outer end of the lost motion coupling. As a result, once cutting unit 103 is lowered to the ground surface, in the no downforce position, rod 173 does not push against pivot pin 148. While cutting unit 103 remains in the lowered position, the lift and lower mechanism does not urge crank 153 and lift arm 108 to pivot in a direction to apply downforce to the cutting unit. While cutting unit 103 is on the ground surface, lost motion coupling 143 allows rod 173 to continue extending from hydraulic cylinder 139 without continuing to urge the cutting unit down.

As shown in FIG. 7, the operator may elect to apply downforce to cutting unit 103 by inserting pin 177 into hole 167 in lost motion coupling 143. In the downforce position, pivot pin 148 is captured at the outer end of the lost motion coupling. As a result, once cutting unit 103 is lowered to the ground surface, in the downforce position, rod 173 pushes against pivot pin 148, causing crank 153 and lift arm 108 to pivot in a direction to apply downforce to cutting unit 103.

As shown in FIGS. 8-10, the lift and lower mechanism for cutting units 105-06 may be hydraulic cylinder 140 that retracts rod 174 to raise cutting units 105-06 to a transport or service position. In one embodiment, sleeve 175 may be connected transversely to rod 174. Pivot pin 149 may be inserted through sleeve 175, so that the pivot pin can slide along slots 181, 191 in plates 180, 200. Cranks 154, 204 and lift arm 110 are attached to shaft 162, and cranks 155, 205 and lift arm 111 are attached to shaft 163. If rod 174 is retracted, this causes pivot pin 164 to slide toward the inboard ends of slots 183, 193, while pivot pin 165 also slides toward the inboard ends of slots 184, 194. This inward sliding movement of pins 164-65 is transmitted to cranks 154-55 through lost motion couplings 195-98, causing lift arms attached to shafts 162-63 to pivot in a direction to raise cutting units 105-06. Optionally, latches 210-11 may be provided to help lock the cutting units in the raised or transport position.

As shown in FIG. 9, rod 174 may be extended to lower cutting units 105-06 without applying downforce. The operator may elect no downforce by inserting spacers 187-88 into lost motion couplings 195 and 197, and spacers 207-08 into lost motion couplings 196 and 198, so as to allow pivot pins 149-50 to slide to the outboard ends of slots 181-82 and 191-92 without applying downforce to the cutting units. As a result, if rod 174 is extended, this causes pivot pin 164 to slide toward the outboard ends of slots 183, 193, while pivot pin 165 also slides toward the outboard ends of slots 184, 194. The outward sliding movement of pins 164-65 urges cranks 154-55, shafts 162-63, and lift arms 110-11 to pivot in a direction to lower cutting units 105-06. In the no downforce position, lost motion couplings 195-98 allow rod 174 to extend fully from hydraulic cylinder 140 without continuing to urge cranks 154-55, shafts 162-63, or lift arms 110-11 to pivot.

As shown in FIG. 10, downforce may be electively applied to cutting units 105-06 by inserting spacers 187-88 into slots 181-82, and spacers 207-08 in slots 191-92 in an alignment that urges lift arms 110-11 to pivot downward while the cutting units are on the ground surface. In the downforce position, spacers 187-88 block pivot pins 149-50 from reaching the outer ends of the slots. As a result, if rod 174 is extended from hydraulic cylinder 140, it pushes pivot pins 149-50 outwardly. Lost motion couplings 195-98 transmit the outward motion of pivot pins 149-50 to urge cranks 154-55 and lift arms 110-11 to pivot in a direction to apply downforce to cutting units 105-06.

Having described the preferred embodiment, it will become apparent that various modifications can be made without departing from the scope of the invention as defined in the accompanying claims.

The invention claimed is:

1. An elective down pressure system for cutting units of a grass mowing machine, comprising:
    a first lift arm supporting a first cutting unit;
    a second lift arm supporting a second cutting unit;
    a lift and lower mechanism with a rod connected to the first lift arm and the second lift arm, the rod being retractable to urge the first lift arm to pivot on a first axis and the second lift arm to pivot on a second axis spaced laterally from the first axis to raise the first cutting unit and the second cutting unit to a transport position, or extendable to lower the first cutting unit and the second cutting unit to the ground surface;
    the lift and lower mechanism having a lost motion coupling that may be set to either a downforce position in which the extended rod applies downforce to the first and the second cutting units after the first and the second cutting units are on the ground surface, or may be set to a no downforce position in which the extended rod does not apply downforce to the first and the second cutting units once the first and the second cutting units are on the ground surface; and
    a removable pin in the lost motion coupling to set the lost motion coupling to either the downforce position or the no downforce position.

2. The elective down pressure system of claim 1 wherein the lost motion coupling is a slotted connection.

3. The elective down pressure system of claim 1 wherein the lift and lower mechanism is a hydraulic cylinder.

4. The elective down pressure system of claim 1 wherein the first lift arm and the second lift arm are connected to rotatable shafts, and the lift and lower mechanism is connected to a crank on each shaft.

5. An elective down pressure system for a plurality of cutting units on a grass mowing machine, comprising:
    a hydraulic cylinder having an extensible rod that the hydraulic cylinder urges toward a retracted position or an extended position;
    a lost motion coupling connecting the rod to a plurality of cranks on a plurality of shafts having different axes, the rod moving toward the retracted position to pivot the cranks on the shafts to raise the cutting units to a transport position, or toward the extended position to lower the cutting units to the ground surface;
    the lost motion coupling having a downforce position in which the hydraulic cylinder urges the rod toward the extended position after the cutting units are lowered to the ground surface, and a no downforce position in which the rod is fully extended while the cutting units are on the ground surface; and
    a removable pin in the lost motion coupling to set the lost motion coupling to either the downforce position or the no downforce position.

6. The elective down pressure system of claim 5 wherein the lost motion coupling is a slotted connection.

7. The elective down pressure system of claim 5 wherein the hydraulic cylinder and rod are connected between a first cutting unit and a second cutting unit.

8. The elective down pressure system of claim 5 further comprising a pivotable lift arm attached to each cutting unit, each rod moving toward an extended position to pivot each lift arm to lower one of the cutting units, and moving toward a retracted position to pivot each lift arm to raise one of the cutting units.

9. The elective down pressure system of claim 8 wherein each pivotable lift arm has a first end attached to one of the cutting units and a second end attached to one of the shafts.

10. An elective down pressure system for a cutting unit on a grass mowing machine, comprising:
    a plurality of cutting units, each cutting unit attached to the outer end of a pivotable lift arm; each pivotable lift arm having a different pivot axis;
    a plurality of lift and lower mechanisms connected to the pivotable lift arms, the lift and lower mechanisms moving in a first direction to urge the lift arms to pivot in a first direction to raise the cutting units, or in a second direction to urge the lift arms to pivot in a second direction to lower the cutting units; the lift and lower mechanisms having lost motion couplings that may be set in a downforce position or a no downforce position; wherein
    in the no downforce position, the lift and lower mechanisms continue moving in a second direction while the cutting units are on a ground surface without urging the lift arms to pivot in the second direction;
    in the downforce position, the lift and lower mechanisms urge the lift arms to pivot in the second direction after the cutting units are lowered to the ground surface;
    wherein the lift and lower mechanisms may be set in the downforce position by inserting pins in the lost motion couplings.

11. The elective down pressure system of claim 10 wherein the lift and lower mechanisms include hydraulic cylinders with extensible rods.

12. The elective down pressure system of claim 11 further comprising lost motion couplings at the end of the extensible rods.

13. The elective down pressure system of claim 10 wherein at least one of the lift and lower mechanisms connects between two lift arms.

* * * * *